(12) United States Patent
Silver

(10) Patent No.: US 12,481,962 B2
(45) Date of Patent: Nov. 25, 2025

(54) SYSTEMS AND METHODS FOR CALCULATING AND DYNAMICALLY RECONFIGURING RESOURCE-CONSTRAINT SCHEDULING USING VISUAL REPRESENTATIONS ON GRAPHICAL USER INTERFACE

(71) Applicant: ABA Schedules, LLC, Little Rock, AR (US)

(72) Inventor: Adam Daniel Silver, Gainesville, FL (US)

(73) Assignee: ABA Schedules, LLC, Little Rock, AR (US)

( * ) Notice: Subject to any disclaimer, the term of this patent is extended or adjusted under 35 U.S.C. 154(b) by 0 days.

(21) Appl. No.: 17/501,534

(22) Filed: Oct. 14, 2021

(65) Prior Publication Data

US 2022/0122042 A1    Apr. 21, 2022

Related U.S. Application Data

(60) Provisional application No. 63/093,747, filed on Oct. 19, 2020.

(51) Int. Cl.
  *G06F 3/0481*    (2022.01)
  *G06F 3/0484*    (2022.01)
  *G06Q 10/1093*   (2023.01)

(52) U.S. Cl.
  CPC ....... *G06Q 10/1095* (2013.01); *G06F 3/0481* (2013.01); *G06F 3/0484* (2013.01)

(58) Field of Classification Search
  CPC .. G06Q 10/1095; G06F 3/0481; G06F 3/0484
  See application file for complete search history.

(56) References Cited

U.S. PATENT DOCUMENTS

| | | | |
|---|---|---|---|
| 7,788,598 B2 * | 8/2010 | Bansal | G06Q 10/06 715/810 |
| 8,400,467 B1 * | 3/2013 | Ponce de Leon | G06Q 10/0631 345/619 |
| 8,612,276 B1 * | 12/2013 | Nielsen | G06Q 10/063118 705/7.22 |
| 8,863,021 B1 * | 10/2014 | Bee | G06F 3/0481 715/780 |
| 10,445,702 B1 * | 10/2019 | Hunt | G06Q 10/1097 |
| 11,176,523 B2 * | 11/2021 | Harms | G06Q 10/1095 |
| 11,328,265 B1 * | 5/2022 | Givoly | G06Q 10/1097 |
| 2006/0293943 A1 * | 12/2006 | Tischhauser | G06Q 10/1095 705/7.19 |
| 2007/0226010 A1 * | 9/2007 | Larsen | G06Q 10/109 705/2 |

(Continued)

*Primary Examiner* — Tuyetlien T Tran
(74) *Attorney, Agent, or Firm* — Richard Blakely Glasgow

(57) ABSTRACT

Computerized systems and methods useful for resource-constraint scheduling using visual representations on a graphical user interface to build one or more schedules across a business network, where the schedules are dynamically reconfigured based off real-time changes to resource availability, constraints and requirements that must be satisfied, where interactions by the user with the schedule at the user interface cause the dynamic, real-time recalculation of possible appointments meeting the constraints, after which a schedule is reconfigured and displayed at the user interface.

13 Claims, 4 Drawing Sheets

(56) References Cited

U.S. PATENT DOCUMENTS

| | | | |
|---|---|---|---|
| 2011/0125539 A1* | 5/2011 | Bollapragada | G06Q 10/043 |
| | | | 705/7.12 |
| 2012/0004942 A1* | 1/2012 | Callanan | G06Q 10/1093 |
| | | | 705/7.22 |
| 2014/0006082 A1* | 1/2014 | Harms | G06Q 10/1095 |
| | | | 705/7.19 |
| 2014/0278683 A1* | 9/2014 | Kennell | G06Q 10/1095 |
| | | | 705/7.19 |
| 2016/0071424 A1* | 3/2016 | Harney | G09B 5/06 |
| | | | 434/350 |
| 2016/0291820 A1* | 10/2016 | Mak | G06Q 10/109 |
| 2016/0292650 A1* | 10/2016 | Smith, III | G06Q 10/1095 |
| 2016/0341752 A1* | 11/2016 | Holmes | G01N 35/0092 |
| 2016/0342953 A1* | 11/2016 | Hailpern | G06Q 10/109 |
| 2018/0260253 A1* | 9/2018 | Nanda | G06Q 30/0635 |
| 2020/0210965 A1* | 7/2020 | Garber | G06Q 10/02 |
| 2021/0295984 A1* | 9/2021 | Prokle | G16H 40/20 |
| 2022/0116240 A1* | 4/2022 | Chawla | H04L 12/1831 |
| 2022/0122041 A1* | 4/2022 | Cardoso | G06F 40/30 |

* cited by examiner

From January 9th to February 8th 2023

| Schedule overrides/breaks following constraints | Schedule adheres to following constraints |
|---|---|
| Time gaps between appointments | No Overbooking |
| Minimum session for appointments | Maximum session for appointments |
| Total time for Employee in a week | Client Availability |
| Employee Client Compatibility | Employee Availability |

FIG. 8

SYSTEMS AND METHODS FOR CALCULATING AND DYNAMICALLY RECONFIGURING RESOURCE-CONSTRAINT SCHEDULING USING VISUAL REPRESENTATIONS ON GRAPHICAL USER INTERFACE

CROSS REFERENCE TO RELATED APPLICATIONS

This application claims priority to U.S. provisional patent application 63/093,747, filed on Oct. 19, 2020 and entitled "Automated Scheduler with Visual Editor." Such application is incorporated by reference herein in its entirety.

STATEMENT REGARDING FEDERALLY SPONSORED RESEARCH OR DEVELOPMENT

Not applicable.

BACKGROUND OF THE INVENTION

In an organization with numerous employees booking appointments with numerous clients, the number of variables and constraints necessary to determine a working schedule can be overwhelming. The schedule master must consider things such as employee availability, client availability, room availability, insurance networking, who works well with who, supervision hours, recommended hours, etc, and it can be incredibly overwhelming. Still, even though it's exhausting for a human to determine a working schedule, after many hours of work, some working schedule can be provided. However, soon after a good working schedule is complete, some change in the schedule (such as a client canceling an appointment, etc.) can throw the whole schedule into a tailspin. Unfortunately, even the most knowledgeable employee or schedule master does not have the ability to calculate, in real-time, all of the possible combinations of appointments and changes that are now available due to that single cancellation. And in an organization where there can be numerous changes in a single day, the ability for an employee to dynamically re-calculate and re-configure the schedule in real-time is just not possible. What is needed is a system and method for resource-constraint scheduling that allows for the automated, dynamic, and real-time recalculation and reconfiguration of scheduling possibilities, all while providing a user with the ability to make dynamic changes to the schedule with the ease of mind that comes with knowing a new reconfigured schedule will be calculated and displayed in real time without delay.

BRIEF SUMMARY OF THE INVENTION

The present invention is generally directed to computerized systems and methods useful for resource-constraint scheduling using visual representations on a graphic user interface to build one or more schedules across a business network, where the schedules are dynamically reconfigured based off real-time changes to resource availability, constraints and requirements that must be satisfied. The systems and methods of the present invention utilize a scheduling algorithm that, in real-time, dynamically calculates all possible appointments (those compliant with constraints and those non-compliant), and displays the possible appointments on a schedule implementing visual representations at a user interface. The present invention can identify the most optimal schedule based on the resources and constraints, and as the user interacts with the schedule to, for example, confirm or decline a specific appointment, the system is designed to recalculate and reconfigure the optimal schedule and possible appointments. These and other objects, features, and advantages of the present invention will become better understood from a consideration of the following detailed description of the preferred embodiments and appended claims in conjunction with the drawings as described following:

BRIEF DESCRIPTION OF THE DRAWINGS

FIG. 2 shows one embodiment of a displayed schedule generated according to one embodiment of the systems and methods of the present invention showing available appointments.

FIG. 3 shows one embodiment of a displayed schedule generated according to one embodiment of the systems and methods of the present invention showing a confirmed appointment and no remaining available appointments.

FIG. 4 shows one embodiment of a displayed schedule generated according to one embodiment of the systems and methods of the present invention showing a confirmed appointment and all remaining possible compliant appointments calculated as a result of the confirmed appointment.

FIG. 5 shows one embodiment of a displayed schedule generated according to one embodiment of the systems and methods of the present invention showing a canceled/declined appointment and all remaining possible compliant appointments calculated as a result of the canceled/declined appointment.

FIG. 8 shows one embodiment of a displayed report generated according to one embodiment of the systems and methods of the present invention, showing compliant and non-compliant constraint adherence.

DETAILED DESCRIPTION OF THE INVENTION

Figure 1:
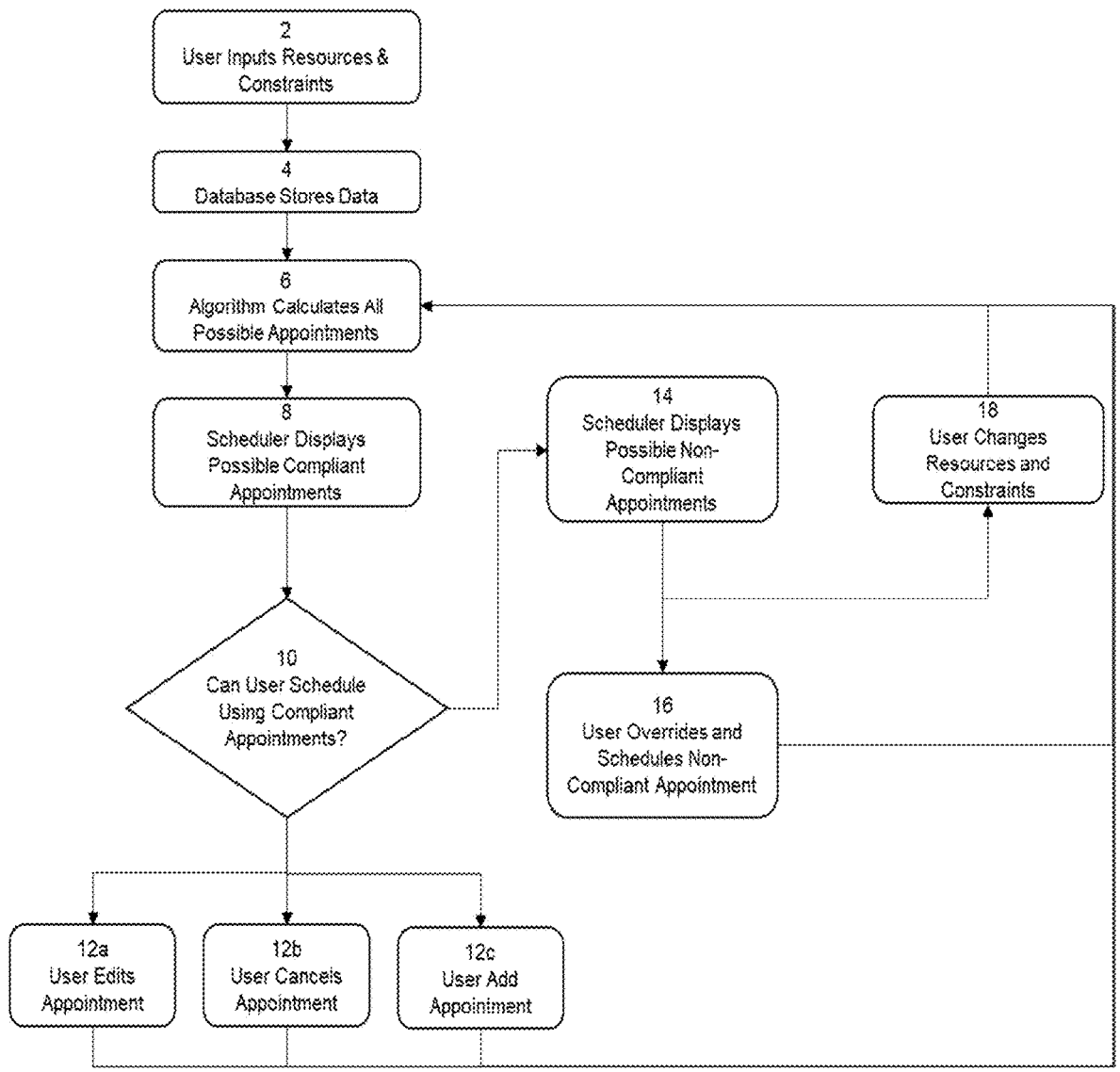
FIG. 1 shows one embodiment of the method of the present invention.

Generally speaking, the present invention is directed to systems and methods useful for building a dynamic and interactive resource-constraint schedule using virtual representations on a graphical user interface, where interactions with the displayed schedule by a user at the user interface, cause the reconfiguration of the displayed scheduled based on the user's interaction and the resources and constraints input into the system. Visual representations are utilized to show appointments that can be scheduled and remain in compliance with the constraints provided, and, in one embodiment, appointments that can be scheduled but if scheduled would not be compliant with the constraints in place. Given the number of constraints placed on scheduling, and in order to maximize the number of available appointments that would comply with the constraints, as the user interacts with the displayed schedule at the user interface, a reconfiguration of the schedule is display to show the remaining possible appointments that would be compliant with the constraints.

In one embodiment, the systems and methods of the present invention may be implemented by a computer system or a collection of computer systems, each of which includes one or more processors executing program instructions stored on a computer-readable storage medium coupled to the processors. The systems and methods may further include a scheduling application executable from a server connected to a network. Further, the present invention may further include a memory operably associated with the processor and at least one data store device operably associated with the memory and the processor. A user interface may be operably associated with the memory and processor, where the user interface is configured to display to a user a generated schedule with visual representations, and where the user interface is further configured to receive interactive communications from the user, upon which the generated scheduled is configured and reconfigured, as described more fully below. Visual representations that identify which appointments are available, scheduled, canceled, or supervised are all different visuals (such as colors, shapes, etc.) to help the user understand the schedule. In one embodiment, the system can display a schedule for a particular resource or can generate and display a master schedule for all resources within an organization. It may be seen that in order to ease in the viewing and interaction with the schedule, the master schedule distinguishes each resource (such as client and employee) with a different color.

Generally speaking, the present invention includes an integrated system of computerized components that includes a number of routines and engines that execute a series of steps at a microprocessor in a particular order to configure, display, and reconfigure the schedule with visual representations. The routines and engines execute the particular series of steps according to a set of instructions stored at a non-transitory media coupled to the microprocessor. The routines and engines executing the steps at the microprocessor generally include an input routine 2, a schedule determination engine 6, a schedule display engine 8, a user interaction engine 12, and a schedule reconfiguration engine 6. Each of these particular components is described more fully below. Generally speaking, the routines and engines are configured to receive and store resource input data and constraint input data in a system memory, use the resource input data and constraint input data to, via an algorithm of the schedule determination engine, calculate all possible appointments for each resource according to the constraints, dynamically and in real-time display a schedule visually representing the possible appointments for each of the resources at the user interface, receive user interaction with the displayed schedule at the user interface, and based on the user interaction, recalculate all possible appointments and reconfigure the displayed schedule to show the updated appointments via the visual representations at the user interface. These functional steps will be better understood in light of the description of the system and method below.

As noted, the systems and methods of the present invention are useful for the determination of a system-wide schedule across an organization based on the resources available at the organization and constraints placed on appointments for each of the resources or the organization as a whole. In order for the system of the present invention to determine available appointments for each resource (and the available schedule for the organization system-wide), the system must receive resource inputs 2 containing resource data, such as, for example, (a) the number of resources available, (b) the time periods for which each resource is available, (c) the name of each resource, etc. The system receives the resource inputs 2 via the user interface, and the input routine is configured to read the resource data from each resource input and store the resource data in a database 4 or system memory in communication with the microprocessor. Resources data may, for example, be associated with the employees of an organization available for appointments during the given time frame, may be associated with the patients of the organization that are needing to schedule appointments, or may be associated with the rooms available for appointments, etc.

Likewise, in order for the system of the present invention to determine available appointments for each of the resources identified in the resource data received via resource inputs, the system must also receive constraint inputs 2, where the constraint inputs contain constraint data. The constraint data received by the system identifies rules or constraints that must be satisfied in order for an appointment to be available for the resource, and therefore to be visually represented on the displayed schedule as a possible appointment. Constraint data can include rules that identify, for example, (a) the maximum number of resources scheduled for appointments at a single time (e.g. "only 85% of resources can be booked for appointments in the same hour"), (b) the maximum number of resources that can be scheduled for a single, unique appointment (e.g. "no more than two resources can be booked for a single appointment"), (c) the number of appointments a resource can have in a single day (e.g. "no resource can be confirmed for more than five appointments in a single day"), (d) whether any particular resource cannot be scheduled for an appointment for which another particular resource has been scheduled (e.g. "Resource X and Resource A cannot participate in the same appointment"), (e) rules for times at which appointments can be scheduled (e.g. "appointments can only be scheduled between 8:00 am-5:00 pm on weekdays") or ("Resource X cannot be booked for any appointments between 11:30 am-12:30 pm"), and any other constraint that the user wishes to set for all resources, particular resources, all appointments, or particular appointments. So, for example, one constraint can be based on client-insurance, where only those appointments will be displayed for employees who are credentialed by the client's insurance provider. Ultimately, the user is able to identify constraints associated with their organization, where the user can generalize the constraints as desired to specify which resource (s) each constraint affects, in what circumstances each constraint or all constraints apply, and the logic by which the constraints must abide. The system receives the constraint inputs 2 via the user interface, and the input routine is configured to read the constraint data from each constraint input and store the constraint data in a database 4 or system memory in communication with the microprocessor.

As the resource data and constraint data are received by the system 2, the system uses the resource data and constraint data to calculate 6 all possible appointments (or the possible combination of appointments) for each resource. So, for example, if resource data for Resource X is received showing Resource X is an available doctor for seeing patients, resource data for Resource A is received showing Resource A is a patient needing a one-hour appointment with a doctor, and constraint data is received showing Resource X is available Monday through Friday from 8:30 am-5:00 pm, the system can determine a number of possible appointments corresponding to Resource A meeting with Resource X for an hour period falling within the time frame of Resource X's availability. All of these possible appointments can then be displayed at the user interface (as described more fully below). Of course, in practice, the resource input received may include resource data corresponding to a number of doctors (Resource X, Resource Y, Resource Z) and a number of patients needing appointments (Resource A, Resource B, and Resource C). If each of the constraints for Resources X, Y, and Z are the same (i.e. each is available M-F from 8:30 am-5:00 pm), then it is understood that there will be overlap in the possible appointments for each (as Resource A could meet with any of them for the one-hour appointment during the available time frame). These possible combinations are displayed as visual representations on the user interface, as described more below, and due to the potential of overlap, the interaction of the user with one such possible appointment (such as confirming an appointment between Resource X and Resource A for a one-hour time period on Tuesday), will render some of the calculated possibilities as void, requiring for the dynamic recalculation of possible appointment combinations and the dynamic reconfiguration of the schedule and visual representations displayed at the user interface (as described more fully below). It should be noted, of course, that while the example has been used herein of doctors and patients as the resources utilizing the system and methods of the present invention, the invention is not so limited and other possible combinations of resources are contemplated such as teacher-student, lawyer-client, mechanic-vehicle, or any other people or combination of people that require scheduling of appointments based on constraints.

Figures 2, 3, 4, 5:
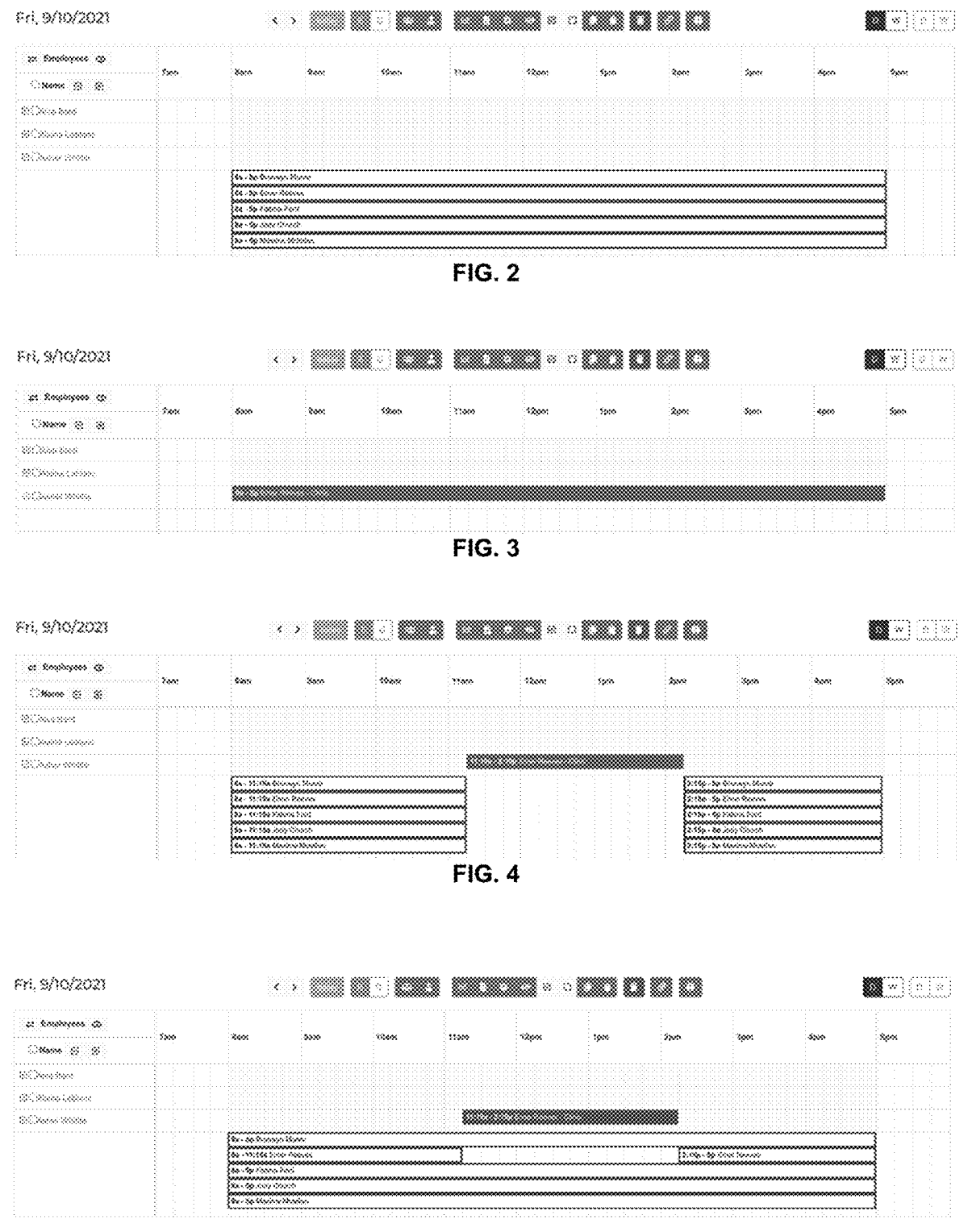

Once the possible appointments for each resource is determined 6 (and thus the possible combination of appointments for the organization is determined), a schedule is displayed 8 at the user interface. The schedule shows at the user interface visual representations that denote possible appointments for the resources, based on the determination made by the system for the resources and constraints. For example, a schedule may be shown that generally includes a calendar showing available appointments for each resource based on a day, week, month, or other time period. A daily schedule may be most appropriate as it allows for the view of a resource's available appointments on a given day, which allows for the user to efficiently manage that resource's schedule for the day. On a daily schedule, for example, the day can be broken into time periods (such as one-hour time periods), allowing for an even more efficient management of the resources' daily schedules. One example of a daily schedule generated by the system is shown in FIG. 2. As shown, there are a number of employee resources that have been identified by the resource data—Ava Bard, Alaina Leblanc, and Asher White. There have also been a number of clients identified by the resource data, including Bronwyn Munro, Emer Reeves, Fatima Ford, Jody Church, and Maxime McLellan. The schedule displayed at the user interface provides visual representations, in the form of white rectangles, that show which clients are available to work with Asher by appointments that meet all constraints identified. As shown, Asher is available for an appointment with any of these clients. One visual representation on the schedule (in this case the white triangle) depicts that these clients are available for appointments with Asher and fully comply with the constraints placed on scheduling.

When the schedule is displayed 8 on the user interface, the system determines whether compliant appointments are possible 10, and if so, the system is configured to receive interaction 12 with the displayed schedule at the user interface by the user. Interactions 12 can include any actions taken by the user for a particular appointment displayed on the schedule, so the user can confirm or book an appointment 12a, decline or cancel an appointment 12b, modify the time of an appointment 12c, etc. So, for example, once the user identifies which of the clients or appointments should be confirmed for a particular doctor, the user can click on the particular appointment to confirm or book that appointment. This interaction, of course, may require the system to dynamically and in real-time recalculate 6 the possible appointments and reconfigure the displayed 8 schedule, depending on the constraints in place. So, for example, as shown in FIG. 3., if an appointment is confirmed scheduling client Emer to work with Asher from 8 am-5 pm, the system will recalculate the possible appointments for Asher based on that interaction and reconfigure the displayed schedule based on the new calculations. As can be seen in FIG. 3, the possible appointments that comply with constraints (e.g. the white rectangles) all disappear from Asher's possible appointments and only a single visual representation for the confirmed appointment between Asher and Emer remains. This is because, one of the constraints that has been placed on the scheduling in this scenario is that there can only be one client with a given employee at a given time, and because employee Asher is scheduled to be with client Emer the entire day, Asher cannot be scheduled with any other client during that day and remain in compliance with the employee-client constraint. The displayed schedule has been reconfigured and redisplayed in real-time based on the user interaction and based on the underlying calculation of a new combination of possible appointments that comply with constraints.

Other interactions with appointments on the schedule displayed at the user interface can cause other reconfigurations of the displayed schedule. For example, as shown in FIG. 4, if the duration of the appointment between employee Asher and client Emer is changed from 8 am-5 pm to 11:15 am-2:15 pm, then the possible appointments for Asher for other times where he is no longer scheduled to meet with Emer are displayed on the schedule, again as visual representations indicating possible appointments that comply with constraints (e.g. white rectangles). Because the constraint in this scenario is that an employee (Asher) cannot meet with more than one client at a given time, those appointments are redisplayed because Asher is no longer meeting with client Emer at those times (and thus, he is not constrained from meeting with any other client at those times). Alternatively, another interaction possible with the schedule is the cancellation of an appointment. This type of interaction will also result in the recalculation of possible appointments and the reconfiguration of the displayed schedule. Returning to the example above where an appointment has been confirmed with Emer at 11:15 am-2:15 pm, if that appointment is canceled (for example, because Emer is no longer available to attend an appointment at that time), then the user will interact with the user interface to indicate that the appointment has been canceled, and the remaining available appointments will be recalculated and the schedule will be reconfigured and displayed with visual representations showing Asher's availability for other clients at the originally scheduled time, and Asher's availability to have an appointment with Emer at other times on that day. This is shown, for example, in FIG. 5. As shown, the canceled appointment can be visually represented by one color (e.g. dark rectangles), while the available appointments can be visually represented by another (e.g. white rectangles). Other possible user interactions with the displayed schedule at the user interface are also contemplated. Of course, the core of the invention is that with each interaction, the available appointments are recalculated by the system based on how that user interaction affects the remaining available appointments, and that after the recalculation, the system reconfigures the schedule and displays the reconfigured schedule at the user interface. This recalculation, reconfiguration, and display happens in real-time almost instantaneously with the user interaction to provide a seamless display of the new schedule as the user interacts with the existing schedule displayed.

Figure 6:
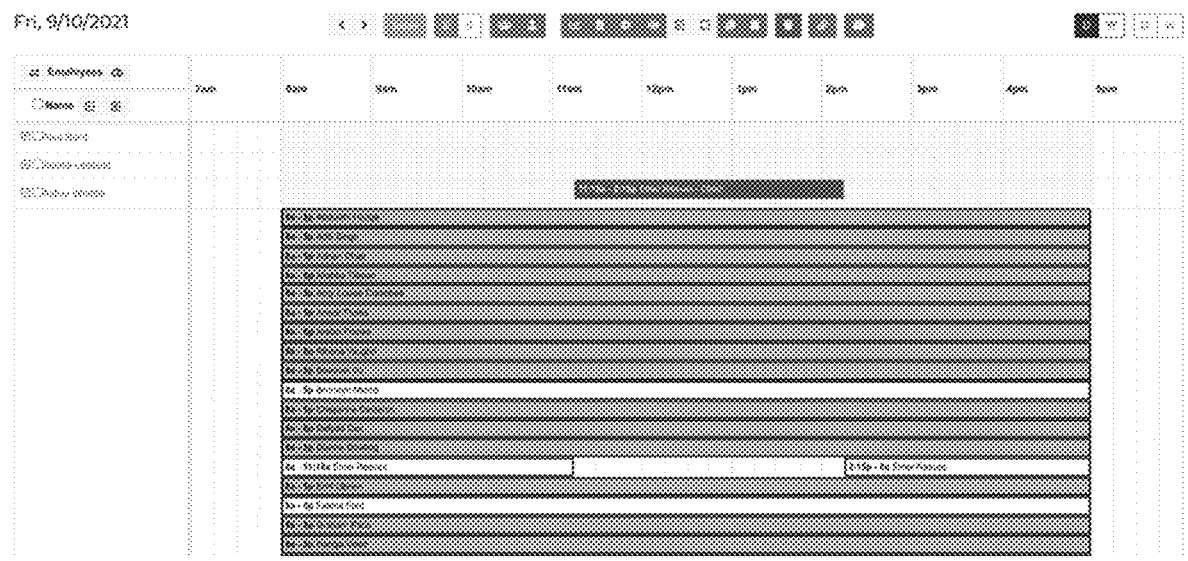
FIG. 6 shows one embodiment of a displayed schedule generated according to one embodiment of the systems and methods of the present invention showing a canceled/declined appointment, all remaining possible compliant appointments calculated as a result of the canceled/declined appointment, and all remaining possible non-compliant appointments calculated as a result of the canceled/declined appointment.

In one embodiment, the systems and methods of the present invention may include components and steps that allow for the display of even non-compliant appointments 14 on the displayed schedule. This can be useful, for example, to allow the user to confirm that the constraint data has been input correctly, and if not, change the constraint data to allow for the appropriate scheduling calculations and configurations. An example is shown in FIG. 6. Further, while the user would prefer to confirm only appointments that are compliant with the input constraints, allowing the user to see visual representations of the non-compliant appointments also allows the user to override 16 the constraints and confirm a non-compliant appointment, which may be necessary in some limited cases where no appointment is more troubling than a non-compliant appointment. In one embodiment, the system and methods of the present invention allow the user to selectively define one or more constraints as absolutely necessary, meaning that those constraints can never be overridden. In such cases, the appointments that are non-compliant with that absolutely necessary constraint will not be displayed, but appointments that are non-compliant with other constraints that are not absolutely necessary, may be displayed and overridden if needed by the user. For example, the user may provide that it is absolutely necessary to comply with the constraint that only one client can be booked for an employee at a given time. Thus, the system will not allow any schedule to be generated that books more than one client for the same employee at a given time. However, the user may decide that although it is preferred that all appointments comply with the constraint that only employees who are credentialed with the client's insurance provider should be confirmed for appointments with the client, in some cases it may be preferably to confirm an appointment with any employee (even if not credentialed) than not have the client booked for any appointment at all. In these cases, the constraint can be overridden if desired by the user. When the user overrides a constraint and confirms a non-compliant appointment, the same recalculation and reconfiguration of the schedule as described above occurs, allowing for a new, reconfigured schedule to be displayed in real-time at the user interface.

Figure 7:
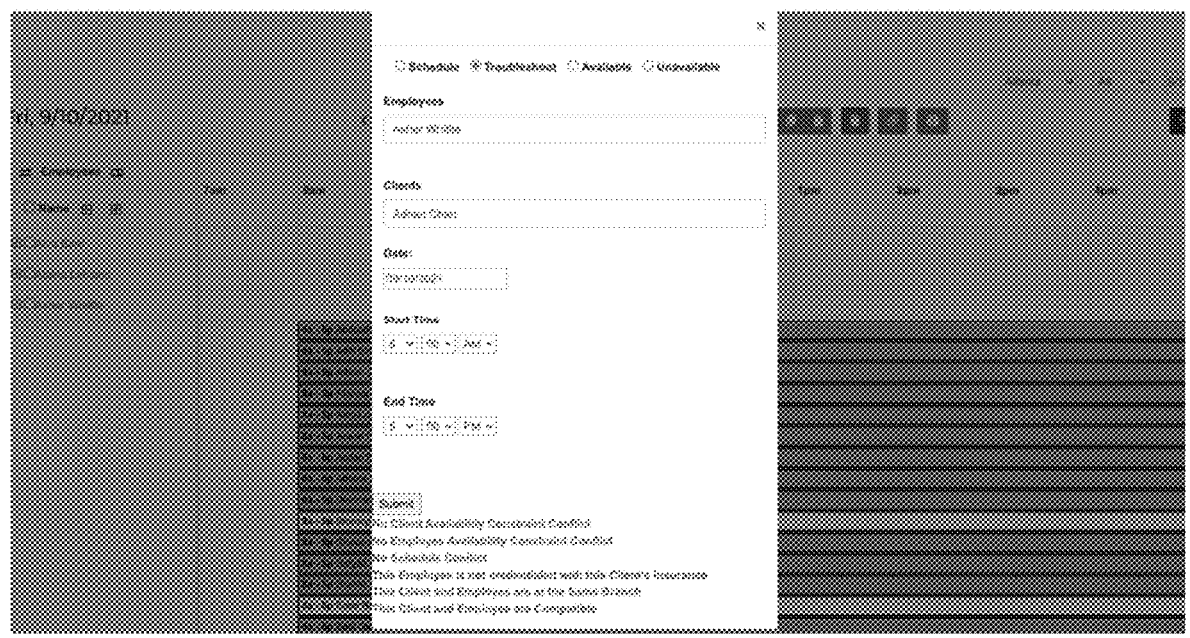
FIG. 7 shows one embodiment of a displayed schedule generated according to one embodiment of the systems and methods of the present invention showing a report of constraints for which confirmed appointments are and are not compliant.

In one embodiment, the system and method records and logs all of the user interactions with the schedule (e.g. confirmation of appointments, cancellation of appointments, etc.). It may also be seen that the system and method, therefore, records and logs all information related to non-compliant appointments, such that the user can determine which constraints are being overridden most frequently and which constraints are most complied with. As shown in FIG. 7, for example, the system identifies for the user that all constraints have been satisfied except for the constraint that the employee be credentialed with the client's insurance.

This report that allows the user to determine which constraints have been overridden and/or which constraints have been complied with can be provided on an appointment-by-appointment basis, as shown in FIG. 7, where the user can see the compliance and non-compliance for a particular appointment by selecting that appointment at the user interface, or, alternatively, in one embodiment, the report can be provided for all appointments falling with a selected date range, as shown, for example, in FIG. 8. As shown in FIG. 8, a report can be generated for a time period (such as January 5thy through February 8th), and a visual indication on the report can be used to indicate to the user which constraints have been overridden/broken and which have been adhered to. In one embodiment, the user can selectively interact with one or more of the constraints on the report (such as, for example, hovering the mouse over the constraint on the user interface, clicking the particular constraint at the user interface, etc.), and the system will show the user which particular appointments in the selected time frame was not compliant with the particular constraint (such as by, for example, generating a list of the appointments non-compliant with the constraint or by displaying the appointment on a calendar showing the scheduled date and time). This report is dynamically updated after every appointment action interaction, allowing the user to see how each appointment action impacts compliance and non-compliance with constraints. In the preferred embodiment, this report is adjacent to the schedule and on the same screen so the user can see updated compliance and non-compliance information in real time when an appointment action is taken.

In one embodiment, the systems and methods of the present invention allow the user to, as needed or desired, update the constraints and resources input into the system. Of course, as constraints and resources are updated, the combination of possible compliant (and non-compliant) appointments must be recalculated, a new schedule must be reconfigured, and the reconfigured schedule must be updated on the display at the user interface. In one embodiment, only a user having administrator privileges can update or change resources and constraints. Likewise, it may be seen that in some embodiments, only a user having administrator privileges is able to interact with the schedule at all to confirm, decline, or change appointments.

In one embodiment, the systems and methods of the present invention can use the calculations of possible appointments and combinations of possible appointments to suggest or provide hints to the user on which appointments, if confirmed, will optimize the use of all resources. That is, in one embodiment, the system may alert the user, for example, that if the select a first appointment option out of a list of five possible appointments for that specific resource, then that selection results in the most remaining possible appointment combinations. Likewise, the system may alert a user, for example, that the selection of a specific appointment for confirmation may result in the least remaining possible appointment combinations, and may suggest that another more optimal appointment be selected.

In one embodiment, the systems and methods of the present invention can utilize a notification system for notifying resources when an appointment is confirmed for their schedule. Returning the example provided above, it may be seen that once Asher is confirmed for an appointment with Emer, the system generates an automated email (or other notification) to Asher providing the appointment details including, for example, where the appointment is to occur, when the appointment is to occur, and with whom the appointment will take place. The notification message could also provide, for example, what constraints have been placed on the appointment and whether or not the appointment is compliant with those constraints.

In the implementations described herein and in various alternative implementations, the present invention may be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention, as set forth in the appended claims.

The invention claimed is:

1. A system useful for building a dynamic and interactive resource-constraint schedule using virtual representations on a graphical user interface, the system comprising:
   a. a user interface;
   b. a processor;
   c. a memory having instructions for execution by the processor to:
      i. receive one or more constraint inputs, wherein the one or more constraint inputs define at least one requirement necessary to establish a compliant appointment;
      ii. receive one or more resource inputs, wherein the one or more resource inputs define each of a number of resources available for booking appointments in a given time period;
      iii. based on the constraint inputs and the resource inputs, determining a combination of one or more possible compliant appointments for each of the number of resources available;
      iv. upon the determination of the combination of possible compliant appointments for each of the number of resources available, display on the user interface a schedule showing each of the possible compliant appointments for each of the resources;
      v. via the user interface, receive an appointment action interaction for a particular one of the possible compliant appointments shown on the user interface;
      vi. based on the appointment action and based the constraint inputs and the resource inputs, dynamically updating the combination of possible compliant appointments for each of the resources available;
      vii. upon updating the combination of possible compliant appointments for each of the resources, reconfigure the schedule displayed at the user interface to show each of the updated possible compliant appointments for each of the resources; and
      viii. for each of a number of appointment actions received at the user interface at any point after the reconfiguration of the schedule, again update the combination of possible compliant appointments for each of the resources available and again reconfigure the schedule displayed at the user interface to show each of the updated possible compliant appointments for each of the resources.

2. The system of claim 1, wherein the appointment action received via the user interface is one of a type of appointment action selected from a list of type of appointment actions comprising (a) confirmation of one of the possible compliant appointments, (b) a declination of one of the possible compliant appointments, (c) a cancellation of a confirmed one of the possible compliant appointments, and (d) an edit of one of the possible compliant appointments.

3. The system of claim 1, wherein the displayed schedule comprises visual representations designating for each of the possible compliant appointments for which an appointment action has been received a type of appointment action associated with the appointment.

4. The system of claim 1, wherein the memory further comprises instructions for execution by the processor to display non-compliant appointments on the displayed schedule in addition to the possible appointments.

5. The system of claim 1, wherein the displayed schedule comprises visual representations signaling compliance or noncompliance with one or more constraints.

6. The system of claim 1, wherein the memory further comprises instructions for execution by the processor to generate a compliance report based on each of the number of appointment actions.

7. A method useful for building and displaying a dynamic and interactive resource-constraint schedule using virtual representations on a graphical user interface, the method comprising the steps of:
   a. receiving one or more constraint inputs, wherein the one or more constraint inputs define at least one requirement necessary to establish a compliant appointment;
   b. receiving one or more resource inputs, wherein the one or more resource inputs define each of a number of resources available for booking appointments in a given time period;
   c. based on the constraint inputs and the resource inputs, determining a combination of one or more possible compliant appointments for each of the number of resources available;
   d. upon the determination of the combination of possible compliant appointments for each of the number of resources available, displaying at the user interface a schedule showing each of the possible compliant appointments for each of the resources;
   e. at the user interface, receiving an appointment action for a particular one of the possible compliant appointments shown on the user interface;
   f. based on the appointment action and based the constraint inputs and the resource inputs, dynamically updating the combination of possible compliant appointments for each of the resources available;
   g. upon updating the combination of possible compliant appointments for each of the resources, reconfiguring the schedule displayed at the user interface to show each of the updated possible compliant appointments for each of the resources; and
   h. for each of a number of appointment actions received at the user interface at any point after the reconfiguration of the schedule, again updating the combination of possible compliant appointments for each of the resources available and again reconfiguring the schedule displayed at the user interface to show each of the updated possible compliant appointments for each of the resources.

8. The method of claim 7, wherein the appointment action received via the user interface is one of a type of appointment action selected from a list of type of appointment actions comprising (a) confirmation of one of the possible compliant appointments, (b) a declination of one of the possible compliant appointments, (c) a cancellation of a confirmed one of the possible compliant appointments, and (d) an edit of one of the possible compliant appointments.

9. The method of claim 7, wherein the displayed schedule comprises visual representations designating for each of the possible compliant appointments for which an appointment action has been received a type of appointment action associated with the appointment.

10. The method of claim 7, further comprising the step of selectively displaying non-compliant appointments on the displayed schedule in addition to the possible appointments.

11. The method of claim 7, wherein the displayed schedule comprises visual representations signaling compliance or noncompliance with one or more constraints.

12. The method of claim 7, further comprising the step of generating a compliance report based on each of the number of appointment actions.

13. The method of claim 7, wherein said number of resources available for booking appointments comprises a first resource, a second resource, and a third resource.

\* \* \* \* \*